May 13, 1969  P. J. WARTER, JR  3,443,857
COMPENSATED QUADRATIC ELECTRO-OPTIC MODULATOR
Filed March 26, 1965

INVENTER
P. J. WARTER, JR.
BY
Herbert M. Shapiro
ATTORNEY

United States Patent Office

3,443,857
Patented May 13, 1969

---

3,443,857
COMPENSATED QUADRATIC ELECTRO-OPTIC MODULATOR
Peter J. Warter, Jr., Plainsboro Township, Middlesex County, N.J., assignor to Bell Telephone Laboratories, Incorporated, New York, N.Y., a corporation of New York
Filed Mar. 26, 1965, Ser. No. 443,155
Int. Cl. G02f 1/26, 1/28, 1/36
U.S. Cl. 350—150                                           12 Claims

ABSTRACT OF THE DISCLOSURE

The birefringence over the plane of the incident surface of an electro-optic modulator is maintained constant by arranging first and second quadratic electro-optic crystals optically in series and applying thereto particular first and second bias signals, respectively, 90 degrees out of phase with one another. The modulator comprises the two electro-optic crystals for which the presence and absence of an information signal superimposed on the bias signals provides, respectively, rotation or no rotation of the polarization vector.

---

Figure 1:
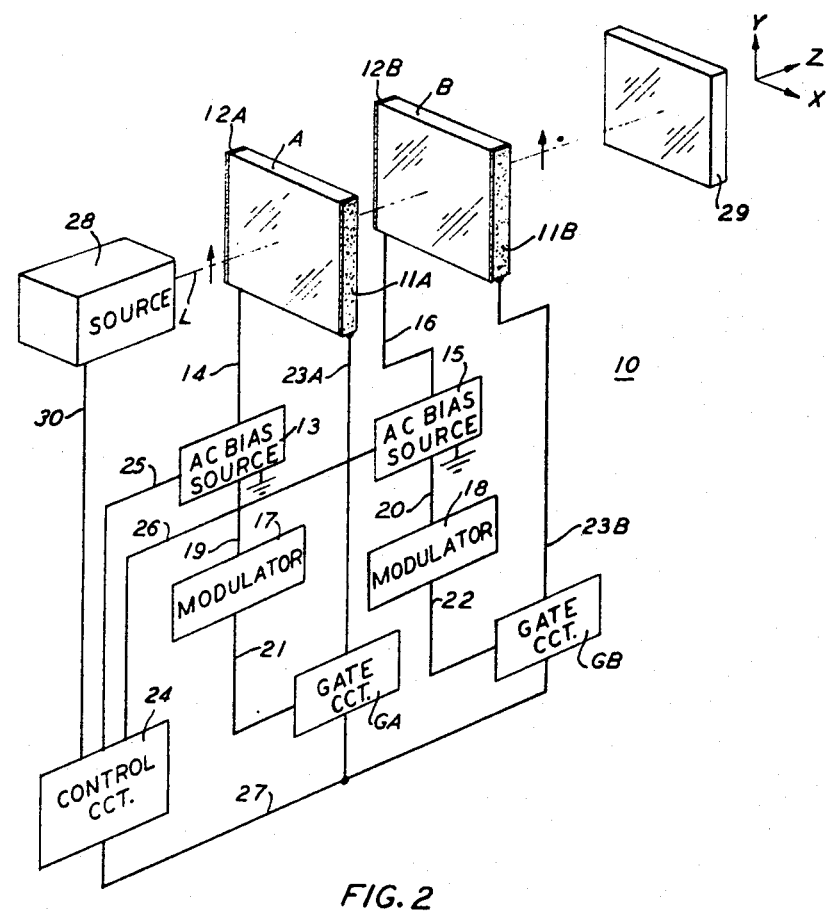

This invention relates to modulators of electromagnetic wave radiation and, more particularly, to "quadratic" electro-optic modulators wherein a change in birefringence is proportional to the square of the amplitude of the electric polarization vector produced by an applied electric field.

Light modulators used, for example, in light deflection systems of the type described in copending application Ser. No. 239,948, filed Nov. 26, 1962, for T. J. Nelson, are operated such that the direction of the plane of polarization of polarized light propagated therethrough is rotated or not depending, respectively, on the presence of a high or relatively low electric field orthogonal to the optical path. Variations in the birefringence over the plane (X–Y plane) orthogonal to the path of the light are the most important factors in controlling the uniformity of the rotation of the plane of polarization of the incident light. Nonuniformity results in noise, in the form of light polarized in an undesired direction, in any system employing a modulator.

More specifically, such modulators typically comprise an electro-optic material including electrodes to which there is applied a voltage comprising a signal for providing rotation and a bias to select an operating point at which the required rotation is achieved at relatively low signal amplitudes. It has been found that the field configuration, due primarily to this latter bias and to the finite resistivity of the electro-optic material, deteriorates to a condition wherein the field is, essentially, nonexistent in the bulk of the material and high in a depletion layer adjacent one of the electrodes. Although the exact configuration of the field is a function of time, the spatial variations of the dielectric constant, and/or variations in bulk resistivity, the general characteristics thereof are frequently determined by the contact between the electrodes and the electrode-optic material. Specifically, for noninjecting contacts, the number of charge carriers entering the electro-optic material is insufficient to support the current associated with the bulk resistivity and a depletion layer, and an associated nonuniform field, results adjacent thereto. In other instances similar variations occur in the absence of contact problems. The result is that the charge in the material varies with time producing an electric polarization vector which is a function of the distance X between electrodes. Consequently, the birefringence varies over the X–Y plane of the material. The problem might be of little concern for high resistivity ($10^{19}$ ohm centimeter) electro-optic material. Such material, however, is presently unavailable. Even if such materials were available, it is expected that photoconduction would cause similar problems.

A solution to the problem would be to provide injecting contacts to sustain a uniform field in the X–Y plane. This solution is impractical because the materials presently available do not have suitably uniform resistivities and dielectric constants. Moreover, space charge limited currents associated with such contacts also produce nonuniform field configurations.

Another solution would be to apply a periodically reversing bias to the electrodes affixed to the electro-optic material where the polarity of the bias changes before depletion layers form adjacent an electrode to cause significant variations in the field. This solution, however, introduces a periodic "down time," for the electro-optic device, which down time is necessarily synchronized with other operations of any system including such a device.

An object of this invention is to provide an electro-optic light modulator with negligibly little variation in the birefringence in the X–Y plane and no "down time."

The above and further objects and features of this invention are realized in one embodiment thereof wherein a pair of quadratic, electro-optic devices are arranged optically in series. Each device is provided with noninjecting contacts similarly positioned astride the optical path therethrough. An A-C bias is applied to each of the electro-optic devices, the bias being 90 degrees out of phase and of a form such that the time average for the sum is zero to avoid net D-C bias and such that light traversing the two devices experiences a total rotation of the plane of polarization thereof which is a constant rotation equal to the sum of the individual rotations produced by each of the two devices. Thus, the birefringence over the X–Y plane is maintained substantially uniform in time by A-C biases which otherwise little affect the operation of the modulator. A signal is selectively superimposed on the A-C biases to further rotate the plane of polarization for binary operation.

Accordingly, a feature of this invention is a composite light modulator comprising a pair of quadratic electro-optic devices arranged optically in series. Each device includes a pair of like positioned electrodes to which an A-C bias is applied, in addition to a selectively applied signal, such that the electric polarization vectors in the two devices are 90 degrees out of phase in time when the modulator is in either of the two states selected by the signal.

Figure 2:
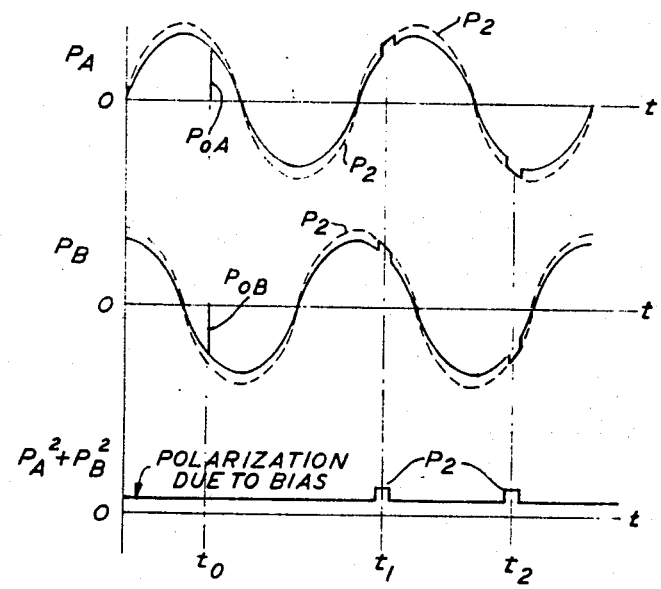

The above and further objects and features of this invention will be understood more fully in connection with the folling discussion, rendered in conjunction with the accompanying drawing, wherein:

FIG. 1 is a schematic arrangement of a composite modulator in accordance with this invention; and FIG. 2 is a graph of the electric polarization vectors of the electro-optic devices of the composite modulator or FIG. 1.

It is to be understood that the figures are not necessarily to scale, certain exaggerations having been made therein for the purpose of illustration.

FIG. 1 shows a composite modulator 10, in accordance with this invention. The modulator comprises first and second electro-optic devices A and B, respectively, arranged optically in series. First and second electrodes 11A and 12A, and 11B and 12B, are fixed to devices A and B, respectively. An A-C bias source 13 for providing current of the form $i = I_m \sin w_o t$, where $I_m$ is a constant and $w_o$ is an A-C bias frequently, is connected between electrode 12A, via a conductor 14, and ground. Similarly an A-C bias source 15 for providing current of the form $i=I_m \cos w_0 t$ is connected between electrode 12B, via a conductor 16, and ground. Bias sources 13 and 15 are connected to modulators 17 and 18, respectively; the connections are by means of conductors 19 and 20. Each modulator is connected to a gate circuit, designated GA and GB, by means of conductors 21 and 22. The gate circuits GA and GB, in turn, are connected to electrodes 11A and 11B of devices A and B, respectively, via conductors 23A and 23B.

A control circuit 24 is connected to bias sources 13 and 15 and to the gate circuits via conductors 25, 26, and 27, respectively. A source 28 of polarized light is positioned adjacent device A and a utilization means 29 is positioned adjacent device B. Control circuit 24 is connected to source 28 via a conductor 30.

The composite modulator, in accordance with this invention, is shown in FIG. 1 in the context of a light deflector for which purpose source 28 may be any source of polarized light capable of operating in accordance with this invention. Similarly, utilization means 29 may be any light responsive element capable of operating in accordance with this invention as, for example, any birefringent material such as quartz or calcite or a prism such as a Wollaston or a Rochon prism. Such sources and utilization means are well known in the art and are shown here only to orient the modulator in one system in which it may find use.

Similarly, each of the gate circuits GA and GB and modulators 17 and 18 may be any logic circuit and device, respectively, capable of operating in accordance with this invention. Also, control circuit 24 may be any such circuit capable of being operated in accordance with this invention. The electro-optic devices may be materials such as quadratic potassium dihydrogen phosphate (KDP), potassium tantalate niobate (KTN), or gallium arsenide. The electrodes may be any noninjecting contact or blocking contact as, for example, a metallic electrode separated from the dielectric by an insulating layer. The metal may be gold or platinum; the insulating layer may be silicon oxide. Such layers are deposited by well known deposition means. The A-C bias sources 13 and 15 also may be any such sources capable of operating in accordance with this invention.

To understand the operation of the composite modulator in accordance with this invention, it is helpful to understand fully that the bias sources 13 and 15 of FIG. 1 operate to reverse periodically the electric fields across the device to avoid the formation of a depletion layer next adjacent ones of the electrodes and, consequently, to avoid associated high nonuniform fields there. Thus, the birefringence over the X–Y plane of each device is maintained uniform. The sources so operate in a manner such that the birefringence of the modulator along the light path, designated the Z direction, is constant. Thus, the total phase retardation (rotation of the plane of polarization) experienced by light traversing the composite electro-optic modulator is constant.

The operation of the A-C bias sources 13 and 15, in a manner to maintain constant the birefringence in the Z direction, is explained before proceeding with the discussion of the operation of the modulator of FIG. 1.

It is known that in easily polarizable dielectrics the electric polarization vector is very nearly equal to the displacement vertor. Accordingly, the polarization vector is a measure of the charge density placed on the surface of the material at the electrode. Since the charge on the surface is equal to the time integral of the current, a cosinusoidal current will produce a sinusoidally varying electric polarization vector. The provision of a constant birefringence in the Z direction in the present embodiment, therefore, is described in terms of currents of particular forms. What is really desired, however, is to have the electric polarization vectors vary in accordance with those particular forms. As an example, currents varying as described herein are one means for providing this variation of the polarization vectors conveniently. Other means are straightforward to one skilled in the art.

In quadratic electro-optic devices, as was stated hereinbefore, the birefringence is proportional to the square of the amplitude of the electric polarization vector produced by an applied field. In a composite modulator in accordance with this invention, a field is generated by each current of the form described. The above relationships can be expressed, as a function of time, in terms of a maximum electric polarization vector $P_0$ and an A-C bias frequency $w_0$, as $P_A = P_0 \sin(w_0 t)$ and $$P_B = P_0 \cos(w_0 t)$$

where $P_A$ and $P_B$ are the electric polarization vectors for devices A and B, respectively. The total birefringence for the modulator in the Z direction, and thus the rotation for the plane of polarization for light traversing the two devices, is equal to $P_A^2 + P_B^2$. Accordingly, the total birefringence equals $$P_0^2([\sin(w_0 t)]^2 + [\cos(w_0 t)]^2)$$

which equals $P_0^2$, a constant for each state of the modulator.

From the foregoing equations, it is clear that the additive effect of the time varying electric polarization vectors on the birefringence of the modulator is constant. FIG. 2 provides visual evidence of this. In this connection, FIG. 2 is a graph representing the electric polarization vectors for the devices A and B of FIG. 1 for applied currents of the form described. For example, the square root of the sum of the squares of the amplitudes of the electric polarization vectors due to the A-C biases is a constant value. The instantaneous amplitudes are indicated in FIG. 2 for an arbitrary time designated $t_0$ by the vertical lines designated $P_{oA}$ and $P_{oB}$. Note that the out-of-phase biases provide different amplitudes for the electric polarization vectors in the two devices at any instant. Specifically, when the value of the vector in the first device is maximum, the value in the other is zero. Also, as the value in the first decreases, the value in the second increases. Since it is the square of these values which is important in determining the effective birefringence of the modulator and thus the rotation of the plane of polarization of light transmitted therethrough, the polarity of the amplitude of the electric polarization vector is of no consequence; the total effect of the electric polarization vectors for the two devices (the modulator) always equals the effect produced by the maximum value for the electric polarization vector in one of the devices. That maximum value is that constant value of electric polarization vector corresponding to the maximum value of applied current. The constant value is equivalent to the electric polarization vector provided by the D-C bias in conventional modulators. In accordance with this invention, however, each device of the modulator is experiencing an A-C bias which prevents the formation of nonuniform fields such as is provided by the formation of a depletion layer therein.

There remains to be shown only that a second value of birefringence is achieved for providing rotation of the plane of polarization for binary operation of the modulator. To show this, we refer to the third line of FIG. 2 which shows the above-mentioned constant value of the electric polarization vector taken as a reference value somewhere above zero. Since this is the value of the effective electric polarization vector in the modulator when rotation of the plane of polarization of incident light is not desired, we may show the value desired for rotating the plane of polarization of incoming light as a higher value, designated $P_2$, at arbitrary times $t_1$ and $t_2$. This second higher value of the electric polarization vector $P_0$ may be provided, of course, by applying A-C biases of the forms described but of a higher maximum amplitude. Such a bias would provide a constant higher value, however, and operation of the modulator in a deflection system requires a pulse to raise the amplitude of the electric polarization vector to the higher value for a prescribed time only and then requires a return to the lower value.

The broken curves shown in the first and second lines of FIG. 2 represent the amplitudes of electric polarization vectors for currents of the forms applied but with a higher maximum value than used for providing the lower maximum value of electric polarization vectors already discussed. The broken curves also are designated $P_2$, the electric polarization vectors indicated thereby correspond to a constant value of birefringence for the modulator higher than that already described. Operation as required, then, is provided by switching, in a manner to be described, from the solid curve to the broken curve when required. This is represented by the discontinuities on the curves in lines one and two of FIG. 2 at times $t_1$ and $t_2$.

Binary operation of the modulator is described hereinafter. For that operation the maximum electric polarization vector $P_o(t)$ has two values. It is noted that unless $P_o(t)$ contains a component at $w_o$, the time average of the electric polarization vector for each device is zero as is the total applied voltage. For binary operation, the bias frequency is advantageously chosen such that the time average is zero, thus avoiding any net D-C bias. Moreover, the A-C bias frequencies are chosen sufficiently low such that reactive bias power and dielectric heating are negligibly small. With high resistivity KTN (up to $10^{14}$ ohm centimeters), power line or audio bias frequencies (about 50 cycles per second to about 10,000 cycles per second) are suitable. For continuous rather than binary modulation, $P_o(t)$ may be varied at different information indicative frequencies.

In binary operation then, sources 13 and 15 provide biases, of the form described, under the control of control circuit 24. Those biases provide currents at the corresponding electrode pairs to provide the constant effective electric polarization vector for the modulator as discussed hereinbefore. Source 28 provides a beam of polarized light, shown in FIG. 1 as a broken line designated L, under the control of control circuit 24. If the light is assumed, arbitrarily, to be polarized in a vertical direction (plane) represented by the vertical arrow adjacent device A in FIG. 1, then the plane of polarization of incident light is unchanged or rotated to the orthogonal direction depending on the presence of a low or relatively high value, respectively, of the biases or of the biases plus signal, respectively, supplied between the electrodes 11A and 12A, and between the electrodes 11B and 12B. That is to say, the plane of polarization is rotated or not depending on the presence or absence of the signal, respectively. To this end, the polarization direction is conveniently at 45 degrees to the preferred axis of the crystal as is consistent with prior art teaching. The biases or the biases plus signal are provided, alternatively, under the control of control circuit 24 by means of A-C bias sources 13 and 15 and gating circuits GA and GB. The sources provide A-C biases of the form described; the gating circuits, under the control of control circuit 24, provide a voltage corresponding to some fraction of the voltage supplying the bias currents to the electrodes of device A and to those of device B. In this connection, modulators 17 and 18, which are, conveniently, transformers, continually sample the output of the A-C bias sources 13 and 15, respectively, providing in a secondary (not shown) thereof time varying voltages proportional to the voltages required to produce the bias currents. Those proportional voltages produce currents which when added to the bias currents raise the instantaneous values of the electric polarization vector substantially to $P_2$. The additional currents are supplied, typically, for a fraction of a microsecond and thus appear only as narrow spikes on a 60 cycle per second bias signal curve as illustrated in FIG. 2.

Thus, light passes to the right, as viewed in FIG. 1, of device B polarized in a direction (plane) represented by the vertical arrow there or in an orthogonal direction represented by a dot. Utilization means 29 is a birefringent material functioning to route light along one of two paths depending on the direction of the plane of polarization of the light. The modulator in accordance with this invention thus finds utility, in one instance, in a stage of a digital light deflector of the type disclosed in the aforementioned Nelson application.

FIG. 1 shows the devices A and B spaced apart. Although such an arrangement is typical and convenient, it is not necessary. The devices may be quite close together.

In one specific embodiment, the composite modulator comprises first and second devices of p-conductivity type KTN, 1 by 1 by ½ cm. The KTN is characterized by a resistivity greater than $10^9$ ohms. Each device has non-injecting evaporated chrome-gold electrodes 1000 angstrom units thick. A-C bias currents of the form $i=I_m \sin w_o t$ and $i=I_m \cos w_o t$ are provided for the first and second devices, respectively. The bias has a frequency of 60 cycles per second and a maximum amplitude of approximately $2 \times 10^{-4}$ amperes. In this case, the total bias birefingence is 40 half waves. The KTN has a relative dielectric constant of approximately $10^4$ at room temperature and the peak bias voltage required is $5.6 \times 10^3$ volts. The signal voltage required to go from 40 to 41 half waves is 7.9 percent of the voltage needed for the current bias. The maximum signal voltage in this case is approximately 450 volts. A helium-neon laser, along with a Nicol prism, is used as the light source.

What have been described are considered to be only illustrative embodiments of the present invention. Accordingly, it is to be understood that other and numerous arrangements may be devised by one skilled in the art without departing from the spirit and scope of this invention.

What is claimed is:

1. In combination, first and second quadratic electro-optic devices, arranged optically in series, means for varying the electric polarization vector of said first device as $\sin w_o t$, and means for varying the electric polarization vector of said second device as $\cos w_o t$ for providing a constant orientation for the plane of polarization for light directed through said first and second devices in a direction transverse to said varying polarization vectors.

2. In combination, first and second quadratic electro-optio devices arranged optically in series, each of said devices having first and second electrodes thereon, said electrodes being positioned to provide like oriented fields therebetween in response to biases applied thereto, first means connected to said first and second electrodes of said first device for applying a first A-C bias thereto, second means connected to said first and second electrodes of said second device for applying thereto a second A-C bias 90 degrees out of phase with said first bias, said first and second biases being of forms such that a substantially constant orientation of the plane of polarization results for light transmitted through said devices.

3. A combination in accordance with claim 2 wherein said first means is a current means for providing current of the form $i=I_m \sin w_o t$ and said second means is a current means for providing current of the form $i=I_m \cos w_o t$.

4. In combination, first and second quadratic electro-optic devices arranged optically in series, each of said devices having first and second electrodes thereon, said electrodes being positioned to provide like oriented fields therebetween in response to biases applied thereto, first means connected to said first and second electrodes of said first device for applying a first A-C bias thereto, second means connected to said first and second electrodes of said second device for applying thereto an A-C bias 90 degrees out of phase with said first bias, said first and second biases being of forms such that a substantially constant orientation of the plane of polarization results for light transmitted through said devices, means for directing polarized light through said devices, and means for selectively superimposing on said first and second A-C biases a signal for rotating the plane of polarization of said light.

5. A combination in accordance with claim 4 wherein said first means is a current means for providing current of the form $i = I_m \sin w_0 t$ and said second means is a current means for providing current of the form $i = I_m \cos w_0 t$.

6. In combination, first and second quadratic electro-optic devices arranged optically in series, each of said devices having first and second electrodes thereon, said electrodes being positioned to provide like oriented fields therebetween in response to biases applied thereto, first means connected to said first and second electrodes of said first device for applying a first A-C bias thereto, second means connected to said first and second electrodes of said second device for applying thereto an A-C bias 90 degrees out of phase with said first signal, said first and second biases being of forms such that a substantially constant orientation of the plane of polarization results for light transmitted through said devices, means for directing polarized light through said devices, and means for selectively changing the instantaneous applied value of each of said first and second A-C biases for rotating the plane of polarization of said light a prescribed constant amount.

7. A combination in accordance with claim 6 wherein said means for selectively changing the value of said first and second biases comprises means for providing modulation signals proportional to each of said first and second biases, and gating means for adding the corresponding modulation signals to each of said first and second biases.

8. A combination in accordance with claim 7 wherein said first means is a current means for providing current of the form $i = I_m \sin w_0 t$ and said second means is a current means for providing current of the form $i = I_m \cos w_0 t$.

9. A combination in accordance with claim 8 wherein said first and second devices are spaced apart.

10. A combination in accordance with claim 9 wherein said first and second electrodes of said first and second devices make noninjecting contacts with said devices.

11. A combination in accordance with claim 10 wherein said first and second quadratic electro-optic devices comprise like materials.

12. A combination in accordance with claim 11 wherein said devices comprise KTN and said electrodes comprise chrome-gold.

References Cited

UNITED STATES PATENTS

| | | | |
|---|---|---|---|
| 2,319,289 | 5/1943 | Becker | 350—150 X |
| 3,239,671 | 3/1966 | Buhrer | 350—150 X |
| 3,290,619 | 12/1966 | Geusic et al. | 350—150 X |

DAVID SCHONBERG, *Primary Examiner.*

P. R. MILLER, *Assistant Examiner.*

U.S. Cl. X.R.

350—157, 160